(12) United States Patent
Feldman et al.

(10) Patent No.: US 11,993,023 B2
(45) Date of Patent: May 28, 2024

(54) THREE-DIMENSIONAL PART SMOOTHING IN REDUCED GRAVITY

(71) Applicant: INTERNATIONAL BUSINESS MACHINES CORPORATION, Armonk, NY (US)

(72) Inventors: Henry Feldman, Needham, MA (US); Theodore Calhoun Tanner, Jr., Charleston, SC (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 17/448,613

(22) Filed: Sep. 23, 2021

(65) Prior Publication Data
US 2023/0092937 A1    Mar. 23, 2023

(51) Int. Cl.
*B29C 64/188* (2017.01)
*B29C 64/386* (2017.01)
(Continued)

(52) U.S. Cl.
CPC ............ *B29C 64/386* (2017.08); *B29C 71/02* (2013.01); *B33Y 40/20* (2020.01); *B33Y 50/00* (2014.12);
(Continued)

(58) Field of Classification Search
CPC ........ B29C 35/0805; B29C 2035/0822; B29C 2035/0827; B29C 2035/0844;
(Continued)

(56) References Cited

U.S. PATENT DOCUMENTS

| 4,444,708 A * | 4/1984 | Gale ..................... B29C 48/156 264/105 |
| 10,300,660 B2 | 5/2019 | Achten |

(Continued)

FOREIGN PATENT DOCUMENTS

| CN | 207273882 U | 4/2018 |
| CN | 109049712 A | 12/2018 |

(Continued)

OTHER PUBLICATIONS

Feldman, et al., "Three-Dimensional Part Smoothing in Reduced Gravity," Application and Drawings, Filed on Sep. 21, 2022, 27 Pages, Related US Patent Application Serial No. PCT/EP2022/076205.

(Continued)

*Primary Examiner* — Leo B Tentoni
(74) *Attorney, Agent, or Firm* — Robert D. Bean (57) ABSTRACT

According to one embodiment, a method, computer system, and computer program product for smoothing one or more surfaces of a 3D-printed object in reduced gravity is provided. The present invention may include positioning one or more radiative heating elements to evenly heat one or more surfaces of a 3D-printed object based on a shape of the 3D-printed object; determining, for at least one of the one or more radiative heating elements, a desired heat output necessary to melt the outermost layers of the one or more surfaces; and pulsing the one or more radiative heating elements to melt the one or more surfaces, wherein the duration and frequency of the pulsing is configured to achieve the desired heat output.

20 Claims, 6 Drawing Sheets

(51) Int. Cl.
B29C 71/02 (2006.01)
B29C 71/04 (2006.01)
B33Y 40/20 (2020.01)
B33Y 50/00 (2015.01)
G05B 6/02 (2006.01)
G05B 13/00 (2006.01)
G05B 15/00 (2006.01)
G21K 5/00 (2006.01)
B29C 37/00 (2006.01)

(52) U.S. Cl.
CPC .......... *G05B 6/02* (2013.01); *B29C 2037/903* (2013.01); *B29C 2791/006* (2013.01)

(58) Field of Classification Search
CPC ...... B29C 2035/085; B29C 2035/0855; B29C 2035/0861; B29C 2035/0866; B29C 2037/903; B29C 64/188; B29C 71/04; B29C 2791/006; B33Y 40/20; G05B 13/00; G05B 15/00; G21K 5/00
USPC ..... 264/40.1, 40.6, 101, 345, 348, 479, 481, 264/488, 489, 491, 492, 494; 425/135, 425/143, 174.4, 445; 250/492.1, 493.1, 250/494.1
See application file for complete search history.

(56) References Cited

U.S. PATENT DOCUMENTS

| | | | |
|---|---|---|---|
| 2007/0241482 A1* | 10/2007 | Giller | B29C 64/165 264/494 |
| 2009/0299353 A1* | 12/2009 | Lewinsky | A61B 18/28 606/16 |
| 2015/0323318 A1* | 11/2015 | Hess | H04N 23/56 348/47 |
| 2015/0360427 A1 | 12/2015 | Shah | |
| 2016/0067925 A1* | 3/2016 | Warwick | B29C 71/0009 425/143 |
| 2016/0101463 A1* | 4/2016 | Snyder | B29C 64/259 425/143 X |
| 2018/0281237 A1 | 10/2018 | Frechman | |
| 2018/0290383 A1 | 10/2018 | Dawson | |
| 2019/0030803 A1* | 1/2019 | Nauka | B29C 64/188 |
| 2019/0184635 A1 | 6/2019 | Garrett | |
| 2022/0355543 A1* | 11/2022 | Erickson | C08L 77/02 |

FOREIGN PATENT DOCUMENTS

| | | |
|---|---|---|
| IN | 201841005662 A | 8/2019 |
| WO | 2020007444 A1 | 1/2020 |
| WO | 2023046739 A1 | 3/2023 |

OTHER PUBLICATIONS

International Searching Authority, "Notification of Transmittal of the International Search Report and the Written Opinion of the International Searching Authority, or Declaration," Patent Cooperation Treaty, dated Jan. 26, 2023, 13 pages, International Application No. PCT/EP2022/076205.

Mell, et al., "The NIST Definition of Cloud Computing", National Institute of Standards and Technology, Special Publication 800-145, Sep. 2011, 7 pages.

* cited by examiner

THREE-DIMENSIONAL PART SMOOTHING IN REDUCED GRAVITY

BACKGROUND

The present invention relates, generally, to the field of computing, and more particularly to 3D printing.

3D printing relates to a variety of processes whereby three-dimensional objects are constructed by depositing, joining or solidifying layers of material. These processes are controlled by a computer, which constructs the model according to a digital CAD model or 3D model. One of the key advantages of 3D printing is the ability to produce very complex shapes or geometries that would be otherwise impossible to construct by hand, including hollow parts or parts with internal truss structures to reduce weight. As the precision, consistency, and material range of 3D printing increases, so too does the range of applications, from functional or aesthetic prototyping to industrial production, health, and education.

SUMMARY

According to one embodiment, a method, computer system, and computer program product for smoothing one or more surfaces of a 3D-printed object in reduced gravity is provided. The present invention may include positioning one or more radiative heating elements to evenly heat one or more surfaces of a 3D-printed object based on a shape of the 3D-printed object; determining, for at least one of the one or more radiative heating elements, a desired heat output necessary to melt the outermost layers of the one or more surfaces; and pulsing the one or more radiative heating elements to melt the one or more surfaces, wherein the duration and frequency of the pulsing is configured to achieve the desired heat output.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to 3D printing. The following described exemplary embodiments provide a system, method, and program product for, among other things, printing and utilizing configurable radiative heating panels to smooth the surface of a 3D-printed object. Therefore, the present embodiment has the capacity to improve the technical field of 3D printing by enabling 3D printing and smoothing the surface of a 3D-printed object in space.

As previously described, 3D printing relates to a variety of processes whereby three-dimensional objects are constructed by depositing, joining or solidifying layers of material. These processes are controlled by a computer, which constructs the model according to a digital CAD model or 3D model. One of the key advantages of 3D printing is the ability to produce very complex shapes or geometries that would be otherwise impossible to construct by hand, including hollow parts or parts with internal truss structures to reduce weight. As the precision, consistency, and material range of 3D printing increases, so too does the range of applications, from functional or aesthetic prototyping to industrial production, health, and education. One arena where 3D printing stands to make a huge impact is space; in scenarios where the cost and difficulty of bringing mass to orbit is extremely high and available storage space is extremely small, the ability to create any needed part or object from a single material represents a massive advantage.

Currently the human spaceflight program at NASA has been testing 3D printing in space as a way to create on-demand tools, including medical instruments, on long-haul space flights where including every tool is space and weight prohibitive. Since many medical instruments do not require massive mechanical strength, bespoke plastic parts make a fine alternative to traditional stainless-steel instruments used here on earth. The ability to customize the tools to the use (such as a splint to fit a specific astronaut's sprained arm) is one of the advantages that makes 3D printing so useful in space, as is handling unanticipated needs when very far from logistical support.

However, the nature of space means that interstellar 3D printing offers advantages and challenges that are not present in terrestrial 3D printing. The challenges of 3D printing in space essentially boil down to several key issues: first, the lack of gravity means that the 3D printing material must be capable of being held mechanically in place while printing. Second, the printer cannot produce toxic fumes or particulates, given the importance of air quality, fire risk, and limited oxygen within spacefaring vessels. However, the lack of gravity also solves a key technical problem with terrestrial 3D printing; namely, that plastic cannot be deposited in an overhang lest gravity and a lack of support cause the overhanging plastic to droop. This issue is solved on Earth with mechanical 3D printed supports, but such supports are not necessary in space.

The aforementioned constraints make FDM (Filament Deposition Modeling) the technology of choice for 3D printing in space, as even on Earth an FDM printer can print in an inverted position without difficulty, making the method gravity agnostic. However, FDM generated prints work by laying down successive layers of thermoplastic to build up the shape of the object; in the case of curves and bevels the printer is forced to "alias" (create steps) the layers to create the desired curve. This is similar to using bricks to create a curve; you can only approximate the shape of the curve, and the sharp points of the bricks in the curve do not make a smooth surface. This presents a new challenge when it is necessary for the 3D-printed object to have smooth surfaces, such as when the 3D-printed object is a medical device, needs to fit flush against another object, contacts human skin, et cetera.

On Earth with easy access to fresh air and gravity there exists multiple methods to smooth printed objects, such as mechanically (abrasives or machining) or chemically (such as acetone vapor smoothing for ABS plastic parts). These techniques are safe in most environments on Earth given easy access to fresh air. In the case of abrasives, the particles created in abrading plastic will fall to the ground, whereas in space they would float in the atmosphere forever, posing a respiratory hazard and a risk to spacecraft systems. In space, the use of vapors (particularly explosive and toxic vapors such as acetone or other organic solvents) is dangerous and not permitted for safety reasons. Without using abrasives, machining, or chemicals, one of the only remaining methods of smoothing 3D-printed objects is through heat. To smooth a 3D-printed object, one needs to re-liquify the surface of the object to allow reflow of the thermoplastic. However, in gravity this is problematic as the melted material would flow downwards, and any unsupported surface would sag, while in space no such problem exists as even liquids will remain stationary unless acted on. Furthermore, for 3D-printed objects on Earth which comprise removable supports added to the design to support overhanging elements of the object during the printing process, it may not be desirable to heat those supports as such might change the contact fusing of the supports to the object, making the supports difficult to remove. And in the zero-gravity environment of space, convection doesn't work, as there is no "up" in space and heat does not rise. As such, the thermoplastic must be melted using radiative heating. Radiative heating has the advantage that it only heats the surface layers; this creates a melted outer layer which flows flat as the result of surface tension pulling the surface smooth. The small depth of melting also limits potential VOC (Volatile Organic Compounds) that can be released during heating of thermoplastics. A significant challenge to this process is cooling after the smoothing process, as there is no convection cooling in zero gravity. As such, the fastest cooling process to harden the newly smooth layer is conduction via immersion in chilled water or inert gas. This small amount of heat can then be safely and slowly radiated away from the spacecraft.

The heating apparatus itself would consume a moderate amount of electricity (similar to a countertop toaster-oven) given the typical mass of 3D-printed objects. However, it would only be doing this for seconds. This lends itself to a mechanism of only needing bursts of power, which can be managed via capacitor banks to protect the spacecraft's electrical system by the sudden need to provide hundreds of watts of resistive load. To protect the spacecraft from fire, the chamber containing the heater could be exposed to vacuum, or alternatively filled with a circulating inert gas such as nitrogen or $CO_2$ which will allow heat conduction to re-cool the melted surface.

In space, the 3D-printed object requires clamping, as there is no gravity to hold the object stationary against a frictive surface during the printing process. However, the clamp may be very light in its construction, as it only needs to prevent the object from moving due to air currents created by the heating. As such, the clamp may be made as small as possible to minimize the surface deformation around the clamp.

Terrestrial 3D printing methods are completely unsuited to the unique environment of space. As such, it may be advantageous to, among other things, implement a system that overcomes the unique challenges and takes advantage of the benefits of a zero-gravity environment to print, smooth, and cool 3D objects; specifically, by implementing a system that takes into account the clamping requirements in zero gravity, does not introduce dangerous chemicals, particulates, or fire risk to its environment, and requires no convection, by using, for example, filament deposition modeling to create, radiative heating to melt and smooth, and an immersion to cool the 3D-printed object.

According to one embodiment, the invention is a method for smoothing 3D-printed objects in a zero- or low-gravity environment by utilizing an array of configurable heating elements to evenly apply radiative heat to surfaces of the 3D-printed objects.

According to at least one embodiment, the configurable heating elements may be quartz heaters, which can be pulsed quickly to provide powerful radiant heat without high flame risk. Quartz heaters are reliable given the difficulty of providing spare parts. They are also powerable via direct-current (DC) power systems such as those used on spacecraft, with simple off-the-shelf control systems. The heater arrays may be arrayed around the part circumferentially to ensure even heating, particularly under overhangs. Even heating is important as differentially heating and cooling can result in unequal heating/cooling, causing warping (even in the absence of the influence of gravity) due to plastic contraction when cooling.

According to at least one embodiment, the system may include a non-contact infrared thermometer to provide closed-loop control of the heating process to ensure that the plastic's surface is at the appropriate temperature. Underheating will fail to produce correct surface melting, while overheating can damage the polymer chains, damage the structural integrity of the part, or increase the danger of combustion. To prevent thermal runaway conditions a closed-loop control thermocouple may be connected to the heater elements to assure positive control of the heating.

According to at least one embodiment, the configurable heating elements, and in some embodiments the 3D printer as well, may be disposed within a chamber that is either devoid of atmosphere, for instance opened to the void of space, or is filled with a circulating inert gas such as nitrogen or carbon dioxide which will allow heat conduction to re-cool the melted surface.

Herein, low-gravity or zero-gravity may be understood to encompass microgravity, including, for example, the gravitic conditions in low Earth orbit such as those experienced on the International Space Station.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilizing configurable radiative heating panels to smooth the surface of a 3D-printed object.

Figure 1:
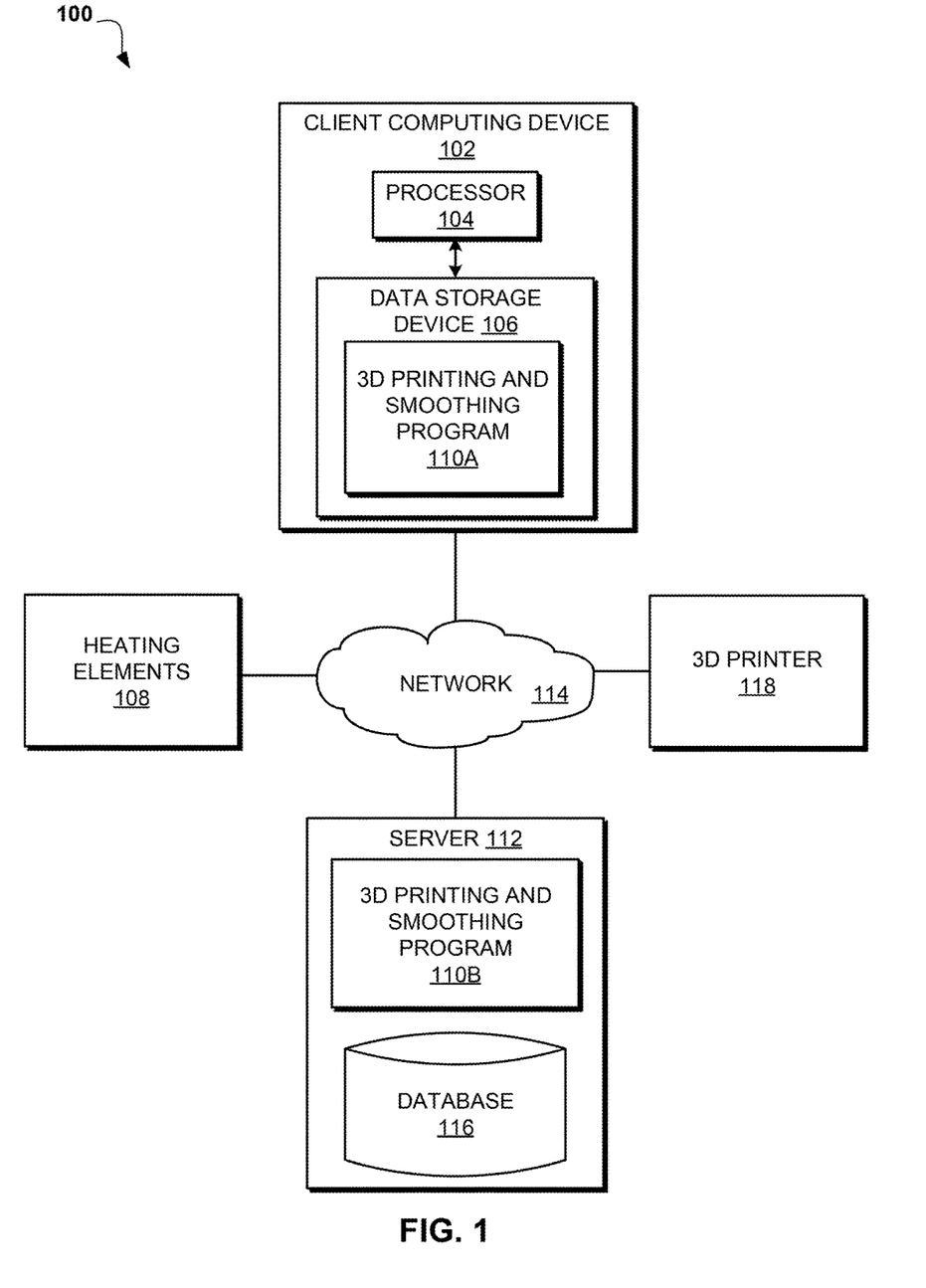
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a 3D printing and smoothing program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 7, the client computing device 102 may include internal components 702a and external components 704a, respectively.

The server computer 112 may be a laptop computer, netbook computer, personal computer (PC), a desktop computer, or any programmable electronic device or any network of programmable electronic devices capable of hosting and running a 3D printing and smoothing program 110B and a database 116 and communicating with the client computing device 102 via the communication network 114, in accordance with embodiments of the invention. As will be discussed with reference to FIG. 7, the server computer 112 may include internal components 702b and external components 704b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The 3D printer 118 may be a device capable of depositing material in successive layers to create a three-dimensional object. The material may be a thermoplastic, capable of undergoing numerous melt and solidification cycles with a minimal change in properties, such as nylon, polyvinyl alcohol (PVA), thermoplastic polyurethane (TPU), et cetera. The 3D printer may be capable of employing a method called filament deposition modeling (FDM) wherein the object is produced by melting a thermoplastic in a print head and extruding the thermoplastic in small beads or streams of material in a pre-defined pattern to build up a three-dimensional object. The 3D printer may construct the object in accordance with a 3D model of the object to be printed provided by a user or crawled from a repository or database. In some embodiments of the invention, the 3D printer may be equipped with a narrow clamp that holds the object while it is being printed and/or smoothed. The 3D printer 118 may be electrically connected to client computing device 102 or server 112 and may be controlled by the 3D printing and smoothing program 110A, 110B.

The heating elements 108 may be radiative heaters, which produce heat by emitting infrared radiation, as opposed to, for example, convective heaters which rely on the transmission of heat through a fluid. The heating elements 108 may, for example, be quartz heaters, which can be pulsed quickly to provide powerful radiant heat without high flame risk. The heating elements 108 may be individually configurable such that each may be separately positioned by a user or by computer via mechanical actuation and maintain that position. The heating elements 108 may be of a variety of sizes and shapes, and be capable of a variety of positions, such that the heating elements 108 may be configured in an arrangement which exposes every accessible surface or substantially every accessible surface of the 3D-printed object to heat, including interior surfaces which are still accessible, such as, for example, the interior of a coffee mug (illustrated in greater detail in FIG. 4). Accessible surfaces may be any surface that can be touched or accessed, whether by a human or machine, excluding those surfaces that are completely enclosed and cannot be accessed short of breaking the 3D-printed object. In some embodiments, the heating elements 108 may be mechanically attached to the 3D printer such that they may be positioned circumferentially around the object to ensure even heating, particularly under overhangs, and maintain that position for at least the duration of the smoothing process. In some embodiments, the heating elements 108 may be flexible, such that the heater can be, for example, flexed to match the surface of the 3D-printed object, or bent into apertures to provide heat to interior surfaces. A flexible heating element 108 may comprise, for example, silicone, or any other flexible material with a high heat tolerance. The heating elements 108 may be electrically connected to client computing device 102 or server 112 and may be individually controlled or positioned by the 3D printing and smoothing program 110A, 110B.

According to the present embodiment, the 3D printing and smoothing program 110A, 110B may be a program capable of printing a 3D object and utilizing configurable radiative heating panels to smooth the surface of a 3D-printed object in a zero-gravity environment. The 3D printing and smoothing program 110A, 110B may be located on client computing device 102 or server 112 or on any other device located within network 114. Furthermore, 3D printing and smoothing program 110A, 110B may be distributed in its operation over multiple devices, such as client computing device 102 and server 112. The 3D printing and smoothing method is explained in further detail below with respect to FIG. 2. In some embodiments of the invention, the functionalities of 3D printing the 3D-printed object and smoothing the 3D-printed object, respectively, may be handled by two separate programs.

Figure 2:
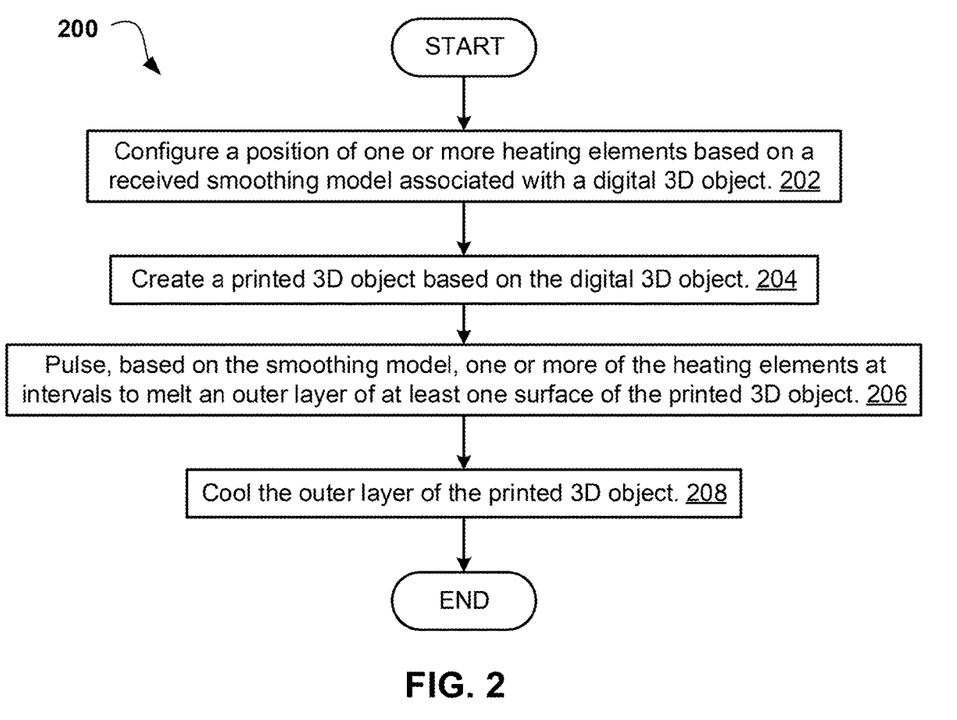
FIG. 2 is an operational flowchart illustrating a 3D printing and smoothing process according to at least one embodiment.

Referring now to FIG. 2, an operational flowchart illustrating a 3D printing and smoothing process 200 is depicted according to at least one embodiment. At 202, the 3D printing and smoothing program 110A, 110B configures a position of one or more heating elements 108 based on a received smoothing model associated with a digital 3D object. The smoothing model may be a document that provides instructions regarding how and where to arrange a number of heating elements 108 to provide even heating over surfaces of a particular 3D-printed object during the smoothing process. The smoothing model may be attached to a digital 3D-printed object, which is a digital model or representation simulating the properties of a 3D object which contains all the information necessary to create a physical version of the digital 3D printed model through the 3D printing process. The smoothing model may further specify which surfaces of the 3D-printed object to smooth and may include instructions to only arrange heating elements 108 to heat a subset of surfaces of the 3D-printed object.

The arrangement of heating elements 108 described in the smoothing element, including the distance of each heating element 108 from the surface of the 3D-printed object and the angle of the heating element 108 relative to the surface of the heating element 108 may be tailored to the shape of the 3D-printed object. The shape of the 3D-printed object and the angle at which a heating element 108 is disposed relative to the 3D-printed object may determine the amount of surface area that radiated heat is spread over. The higher the surface area the heat is spread across, the less heat each unit of area receives. For example, a first heating element 108 will provide more heat per square millimeter of surface area than a second heating element 108, even though both heating elements 108 provide identical heat output, if the first heating element 108 is squarely facing the surface of the 3D-printed object and the second heating element 108 is at a sharp angle, such that radiated heat from the second heating element 108 spreads over a wide area relative to the first. As such, in some embodiments of the invention, the 3D printing and smoothing program 110A, 110B may position and angle the heating elements 108 relative to the surface of the 3D-printed object such that each heating element 108 radiates heat over equal or roughly equal amounts of surface area to ensure even heating.

In some embodiments of the invention, for instance where no smoothing model is provided, 3D printing and smoothing program 110A, 110B may analyze the digital 3D object to ascertain the size and shape of the physical 3D-printed object and arrange the heating elements 108 to conform as best as possible to the shape of the physical 3D-printed object. In some embodiments of the invention, for instance where no smoothing model or digital 3D object is provided, 3D printing and smoothing program 110A, 110B may record or receive data from lidar, one or more cameras, laser rangefinding sensors, et cetera regarding the shape of the 3D-printed object, analyze the data to extract the shape, and arrange the heating elements 108 to conform to the detected shape of the physical 3D-printed object. In some embodiments of the invention, for example where the heating elements 108 are not mechanically actuated but must be manually positioned by a human, 3D printing and smoothing program 110A, 110B may communicate the correct positions of the heating elements 108 to a human user and/or prompt the human user to manually position the heating elements 108, for example using graphical elements on a display and/or audio cues, synthesized language, text, et cetera. The 3D printing and smoothing program 110A, 110B may prompt the user for confirmation that the heating elements 108 were correctly positioned.

At 204, 3D printing and smoothing program 110A, 110B creates a printed 3D object based on the digital 3D object. The digital 3D object may be a digital model or representation simulating the properties of a 3D object which contains all the information necessary to create a physical version of the digital 3D printed model through the 3D printing process. The 3D printer 118 may utilize FDM (Filament Deposition Modeling) to build the printed 3D object by melting a thermoplastic in a print head and extruding the thermoplastic in small beads or streams of material in a pre-defined pattern in accordance with the digital 3D object, one layer at a time. During the printing process, the 3D-printed object may be secured in place with a clamp attached to the 3D printer 118.

At 206, 3D printing and smoothing program 110A, 110B pulses, based on the smoothing model, one or more of the heating elements at intervals to melt an outer layer of at least one surface of the printed 3D object. 3D-printed objects may come in many different shapes and sizes, may be comprised of a number of different materials with different melting temperatures, and may comprise many different structural elements of differing thicknesses. Accordingly, to smooth the surface layer of the 3D-printed object, the heating elements 108 must produce enough heat to overcome the melting point of the material or materials comprising the surface of the 3D-printed object. Furthermore, the heating elements 108 must provide an amount of heat that is tailored to the thickness of the surface of the 3D-printed object; since thinner sections have less thermal mass than a thicker section, thinner sections will heat up more quickly than thicker sections even where the same amount of heat is applied to both sections. Additionally, as mentioned above, the shape of the 3D-printed object and the angle at which a heating element 108 is disposed relative to the 3D-printed object may control the amount of surface area that radiated heat is spread over. The higher the surface area the heat is spread across, the less heat each unit of area receives. As such, all these factors must be taken into account to determine how much heat output is required for each heating element 108 to provide even heating of the surfaces of the 3D-printed object that are chosen to be smoothed and prevent over or under heating of any particular surface.

As such, 3D printing and smoothing program 110A, 110B may determine a desired heat output for each of the heating elements 108 based on the material comprising the 3D-printed object or the material comprising the surface to be heated by a given heating element 108, the shape of the surface of the 3D-printed object under a given heating element 108, and an angle of the heating element relative to the surface of the 3D-printed object under the given heating element 108. The desired heat output may be the amount of heat necessary to melt the outermost layers of the chosen surfaces of the 3D-printed object. The desired heat output may be the amount of heat necessary to produce the minimum depth of melting possible to achieve a smooth surface, to limit the potential release of volatile organic compounds which may occur during heating of thermoplastics. As controlling the voltage of a heating element 108 may be difficult, pulsing the heating element 108 by repeatedly turning it on for a brief period before turning it off again may provide more granular control of the output of each heating element 108; accordingly, based on the desired heat output for a given heating element 108, the 3D printing and smoothing program 110A, 110B may configure a pulse duration and frequency for that heating element that will achieve the desired heat output. In some embodiments of the invention, 3D printing and smoothing program 110A, 110B may perform the pulsing of the heating elements 108 based on the smoothing model, which may provide instructions for pulsing the heating elements 108 based on the shape of the digital 3D-printed object with which the smoothing model is associated.

According to at least one embodiment, the system may include one or more non-contact infrared thermometers disposed to monitor surface temperatures of the 3D-printed object during the smoothing process, and to thereby provide closed-loop control of the heating process to ensure that the plastic's surface is at the appropriate temperature. In some embodiments of the invention, the 3D printing and smoothing program 110A, 110B may dynamically adjust the position and/or pulse duration and/or frequency of one or more heating elements 108 responsive to readings from the infrared thermometer, to maintain even heating and/or ensure that the heating element 108 remains hot enough to ensure surface melting while cool enough to prevent damage to the polymer chains, damage the structural integrity of the 3D-printed object, and/or create a danger of combustion. In some embodiments of the invention, a closed-loop control thermocouple may be connected to the heater elements to assure positive control of the heating and prevent thermal runaway conditions.

At 208, 3D printing and smoothing program 110A, 110B cools the outer layer of the printed 3D object. The 3D printing and smoothing program 110A, 110B may cool the outer layer of the 3D-printed object using an immersion, wherein the printed 3D object is cooled by immersing the 3D-printed object in a non-flammable fluid such as chilled water or inert gas such as nitrogen or carbon dioxide to conduct heat away from the 3D-printed object. The remaining heat thus transferred into the chilled water or inert gas may be then radiated into space. In some embodiments, for example where an inert gas or chilled water are not available, the 3D-printed object may be cooled at a slower rate by radiating heat directly into space. In some embodiments of the invention, for example where the 3D-printed object is smoothed in a chamber filled with vacuum, the chamber may be filled with a fluid coolant such as chilled water or inert gas subsequent to the smoothing process to cool the 3D-printed object, and may be circulated using, for example, a fan or pump to improve the rate at which heat conducts into the coolant. The coolant may then be drained from the chamber, for example to facilitate access to the cooled 3D-printed object.

Figure 3:
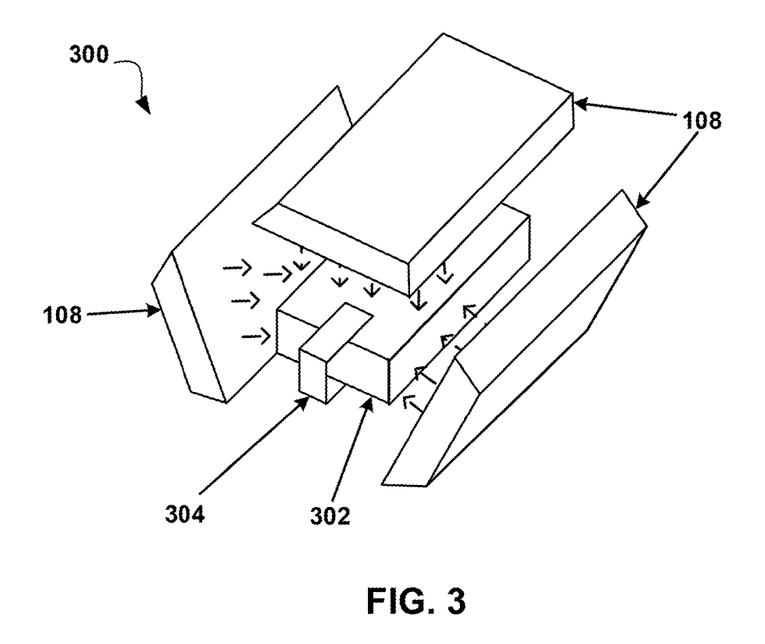
FIG. 3 is a diagram illustrating an exemplary 3D smoothing system according to at least one embodiment.

Referring now to FIG. 3, a diagram illustrating an exemplary 3D smoothing system 300 is depicted, according to at least one embodiment. Here, heating elements 108 are arranged circumferentially around a 3D-printed object 302, which is secured in place by a clamp 304. The heating elements 108 radiate heat onto the 3D-printed object 302. The clamp 304 may be secured to the heating elements 108, to a 3D printer 118, or to any other object or structural element that is of sufficient mass relative to the 3D-printed object 302 to keep the 3D-printed object 302 steady during the 3D printing and/or smoothing process.

Figure 4:
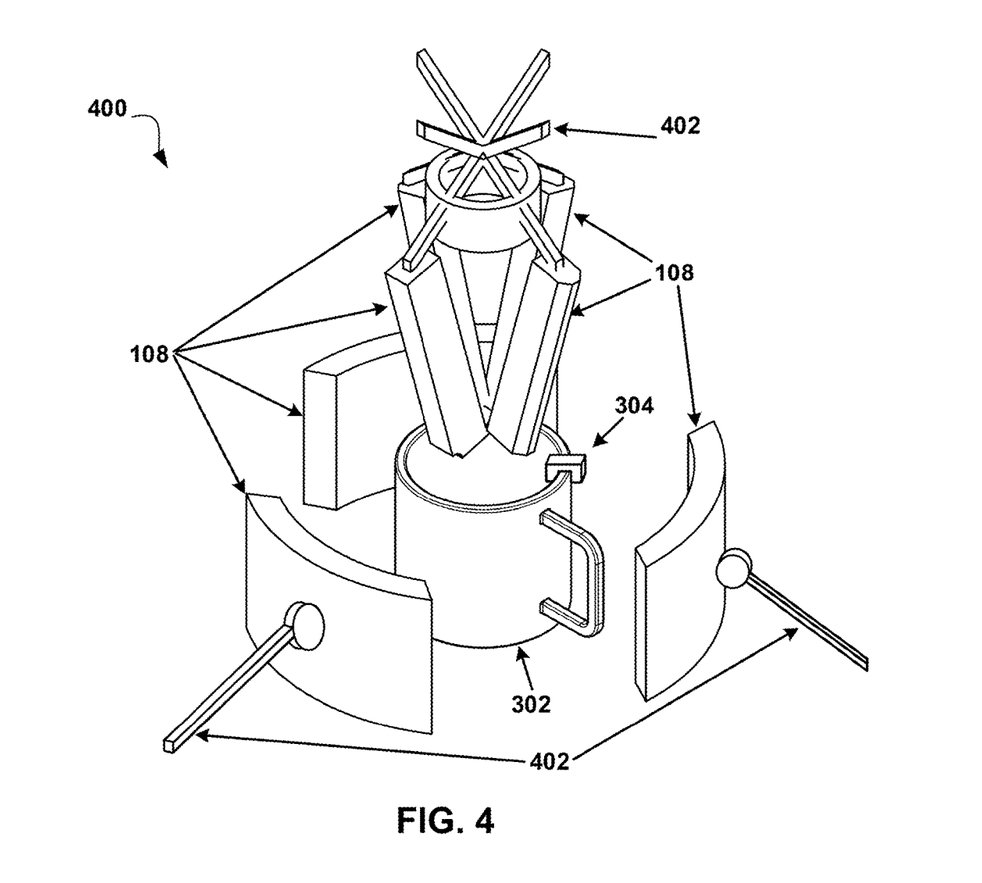
FIG. 4 is a diagram illustrating an alternate exemplary 3D smoothing system according to at least one embodiment.

Referring now to FIG. 4, a diagram illustrating an alternate exemplary 3D smoothing system 400 is depicted, according to at least one embodiment. Here, three flexible heating elements 108 are arranged circumferentially around a 3D-printed object 304 (which is, in this example, a coffee mug) and curved to match the curve of the 3D-printed object 304, while four more heating elements 108 are disposed to radiate heat into the interior of the 3D-printed object 304, ensuring even heating on all surfaces of the 3D-printed object 304. The 3D-printed object 304 is secured in place by a clamp 306. Here, mechanical configurable arms 402 are attached to the heating elements 108, which are capable of maintaining the configuration of the heating elements 108 once they have been positioned relative to the 3D-printed object 304. In some embodiments of the invention, the heating elements 108 may be posed by a user; in some embodiments of the invention, the mechanical arms 402 may be equipped for autonomous motion, for example with hydraulics or servos, and may be moved automatically to position the heating elements 108 relative to the 3D-printed object 304 by 3D printing and smoothing program 110A, 110B.

Figure 5:
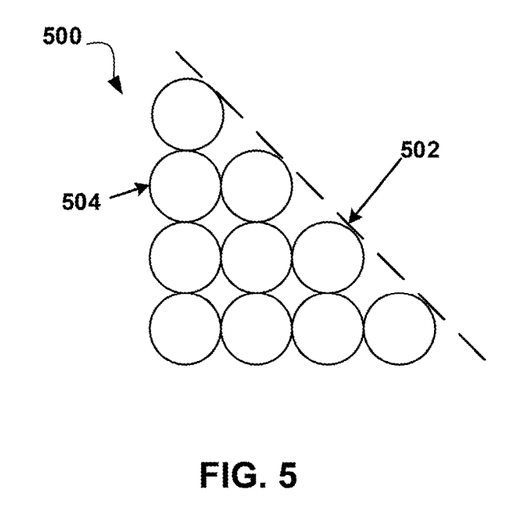
FIG. 5 is an illustration of a cross-section diagram of the surface layer of a 3D-printed object prior to smoothing, according to at least one embodiment.

Referring now to FIG. 5, an illustration of a cross-section diagram of the surface layer of a 3D-printed object prior to smoothing 500 is depicted, according to at least one embodiment. Here, the surface layers of the 3D-printed object are comprised of a number of layered sections of one or more filaments 504, which have circular cross sections when laid during a filament deposition process. The filaments 504 describe a surface plane 502 of the 3D-printed object, which the surface of the 3D-printed object would match were it perfectly smooth; however, due to the circular cross-sections of filaments 504, there exists significant gaps between the filaments 504 on the outermost layer of the 3D-printed object, such that the actual surface of the 3D-printed object significantly deviates from the surface plane 502, resulting in a surface that is rough and potentially unsuitable for a number of applications that require smooth surfaces.

Figure 6:
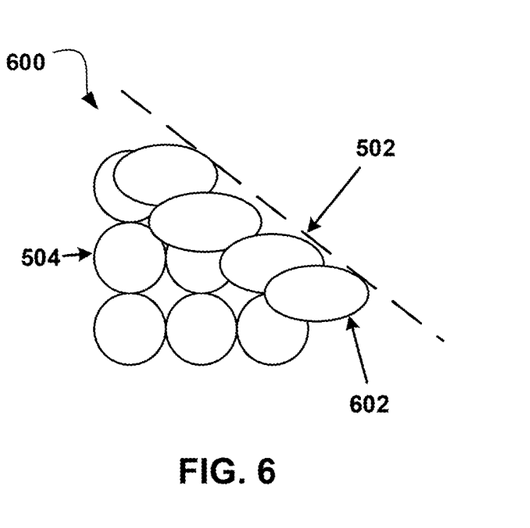
FIG. 6 is an illustration of a cross-section diagram of the surface layer of a 3D-printed object after smoothing, according to at least one embodiment.

Referring now to FIG. 6, an illustration of a cross-section diagram of the surface layers of a 3D-printed object after smoothing 600 is depicted, according to at least one embodiment. Here, the surface layers of the 3D-printed object are comprised of a number of layered sections of one or more filaments 504, which have circular cross sections when laid during a filament deposition process. The filaments 602 describe a surface plane 502 of the 3D-printed object, which the surface of the 3D-printed object would match were it perfectly smooth; here, since a smoothing process has been applied to the surface of the 3D-printed object, the filaments 602 have melted and flowed together thanks to surface tension, deforming from their original circular cross sections and resulting in a surface that more closely matches the surface plane 502, and is accordingly smoother to the touch and potentially suitable for a number of applications that require smooth surfaces.

It may be appreciated that FIGS. 2-6 provide only illustrations of one implementation and do not imply any limitations with regard to how different embodiments may be implemented. Many modifications to the depicted environments may be made based on design and implementation requirements.

Figure 7:
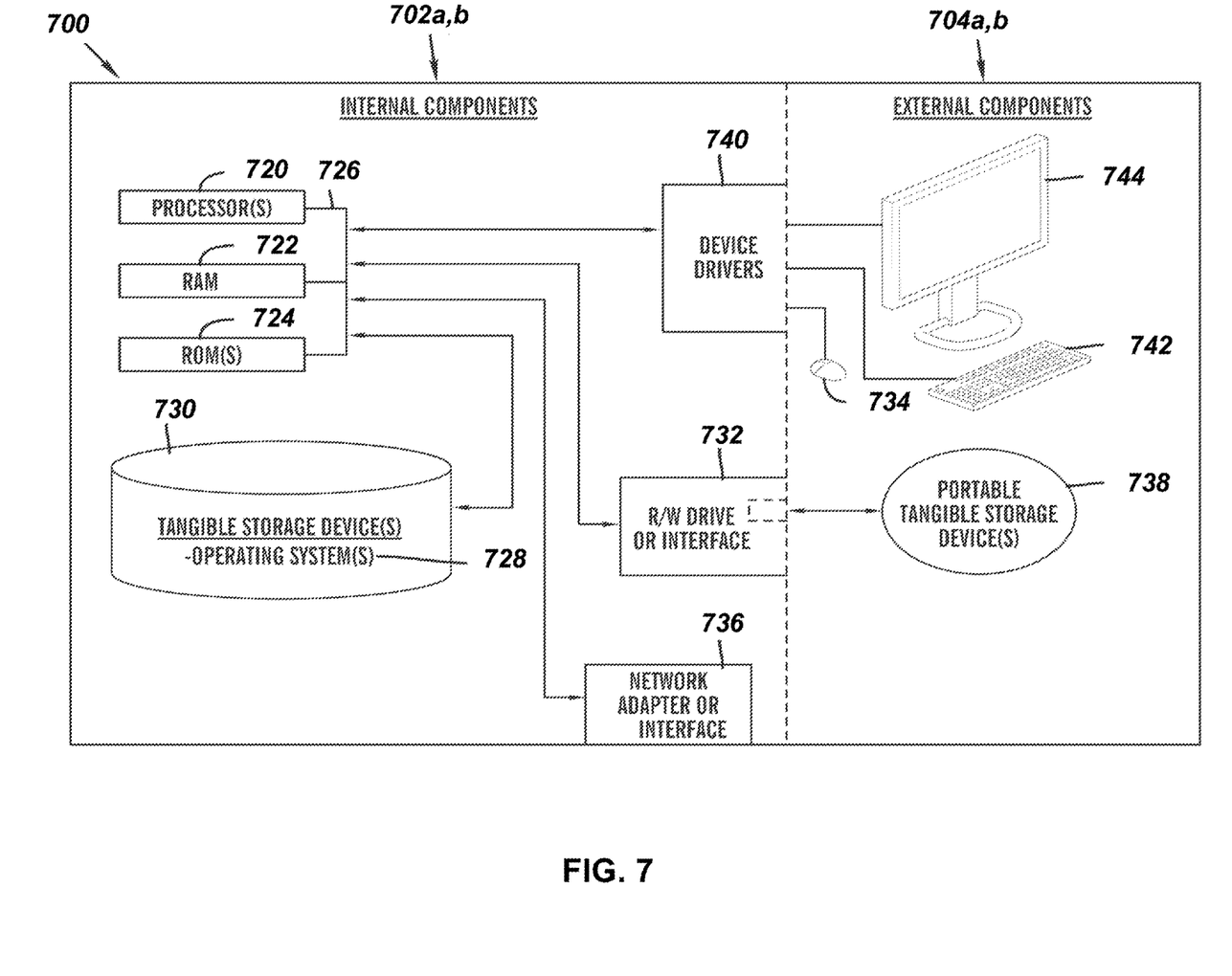
FIG. 7 is a block diagram of internal and external components of computers and servers depicted in FIG. 1 according to at least one embodiment.

FIG. 7 is a block diagram 700 of internal and external components of the client computing device 102 and the server 112 depicted in FIG. 1 in accordance with an embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

The data processing system 702, 704 is representative of any electronic device capable of executing machine-readable program instructions. The data processing system 702, 704 may be representative of a smart phone, a computer system, PDA, or other electronic devices. Examples of computing systems, environments, and/or configurations that may represented by the data processing system 702, 704 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 702 *a,b* and external components 704 a,b illustrated in FIG. 7. Each of the sets of internal components 702 include one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the 3D printing and smoothing program 110A in the client computing device 102, and the 3D printing and smoothing program 110B in the server 112 are stored on one or more of the respective computer-readable tangible storage devices 730 for execution by one or more of the respective processors 720 via one or more of the respective RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 702 a,b also includes a R/W drive or interface 732 to read from and write to one or more portable computer-readable tangible storage devices 738 such as a CD-ROM, DVD, memory stick, magnetic tape, magnetic disk, optical disk, or semiconductor storage device. A software program, such as the 3D printing and smoothing program 110A, 110B, can be stored on one or more of the respective portable computer-readable tangible storage devices 738, read via the respective R/W drive or interface 732, and loaded into the respective hard drive 730.

Each set of internal components 702 a,b also includes network adapters or interfaces 736 such as a TCP/IP adapter cards, wireless Wi-Fi interface cards, or 3G or 4G wireless interface cards or other wired or wireless communication links. The 3D printing and smoothing program 110A in the client computing device 102 and the 3D printing and smoothing program 110B in the server 112 can be downloaded to the client computing device 102 and the server 112 from an external computer via a network (for example, the Internet, a local area network or other, wide area network) and respective network adapters or interfaces 736. From the network adapters or interfaces 736, the 3D printing and smoothing program 110A in the client computing device 102 and the 3D printing and smoothing program 110B in the server 112 are loaded into the respective hard drive 730. The network may comprise copper wires, optical fibers, wireless transmission, routers, firewalls, switches, gateway computers and/or edge servers.

Each of the sets of external components 704 a,b can include a computer display monitor 744, a keyboard 742, and a computer mouse 734. External components 704 a,b can also include touch screens, virtual keyboards, touch pads, pointing devices, and other human interface devices. Each of the sets of internal components 702 a,b also includes device drivers 740 to interface to computer display monitor 744, keyboard 742, and computer mouse 734. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:
  Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.
  Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.
  Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
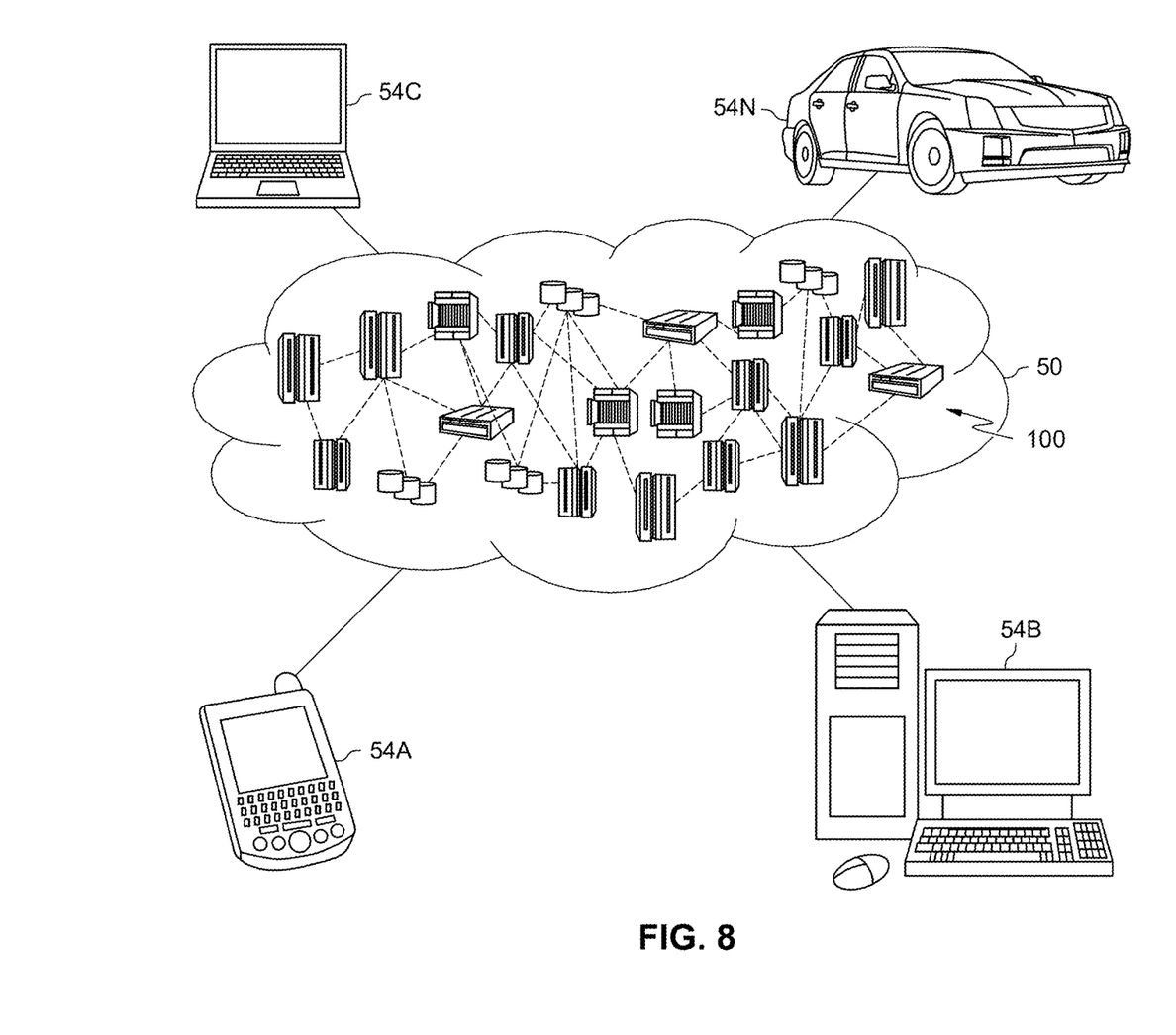
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Figure 9:
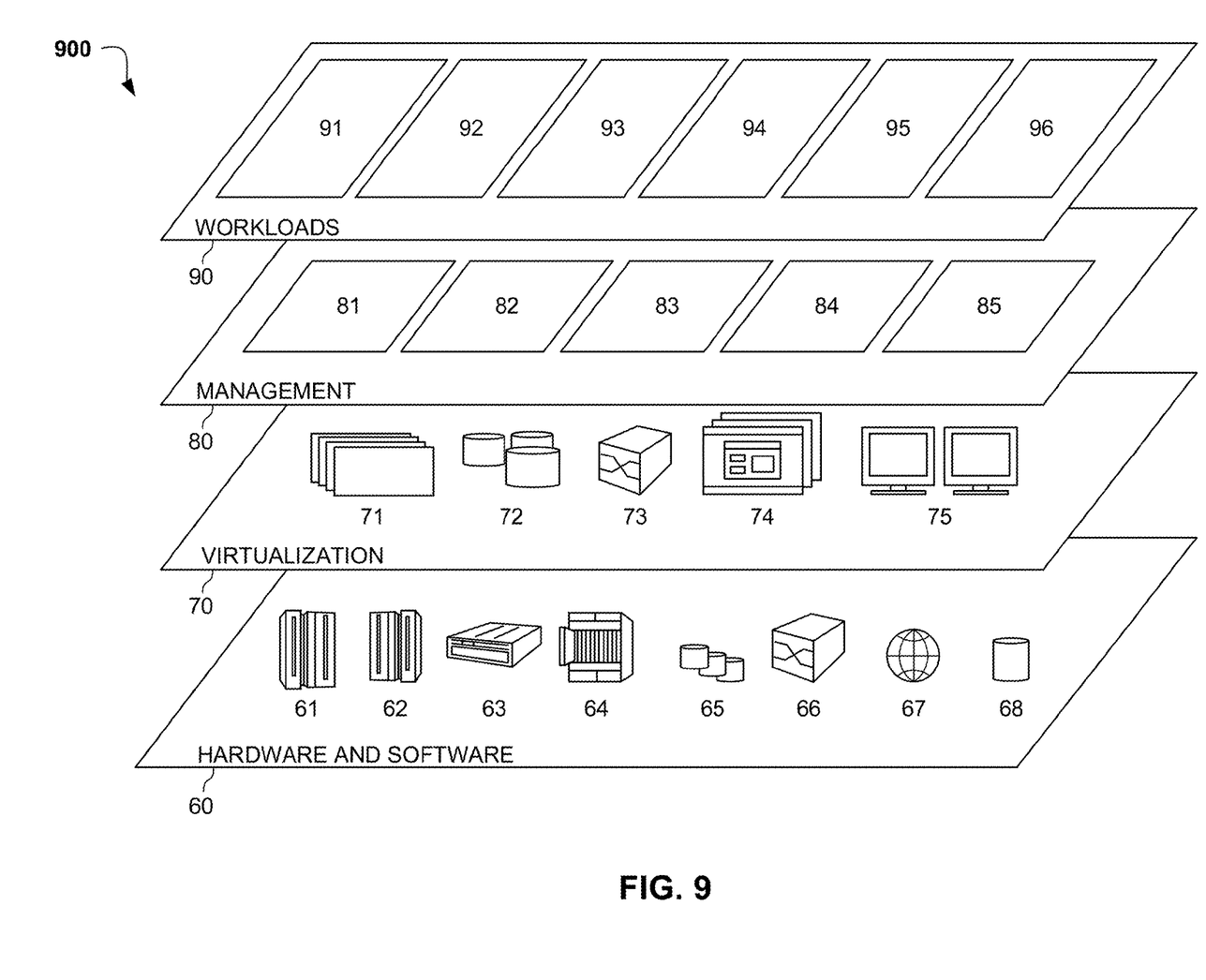
FIG. 9 depicts abstraction model layers according to an embodiment of the present invention.

Referring now to FIG. 9, a set of functional abstraction layers 900 provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and 3D printing and smoothing 96. 3D printing and smoothing 96 may relate to utilizing configurable radiative heating panels to smooth the surface of a 3D-printed object.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for smoothing a 3D-printed object in a low gravity environment, the method comprising:
    positioning a plurality of radiative heating elements within the low-gravity environment to evenly heat one or more surfaces of the 3D-printed object based on a shape of the 3D-printed object, wherein the 3D-printed object is secured in place by a single clamp;
    determining, for at least one of the one or more radiative heating elements, a desired heat output necessary to melt the outermost layers of the one or more surfaces; and
    pulsing the plurality of radiative heating elements to melt the one or more surfaces, wherein the duration and frequency of the pulsing is configured to achieve the desired heat output.

2. The method of claim 1, further comprising:
    cooling the 3D-printed object through immersion in a coolant.

3. The method of claim 1, wherein the plurality of radiative heating elements and the 3D-printed object are disposed within a chamber that is filled with vacuum.

4. The method of claim 1, dynamically adjusting the position, pulse duration, or pulse frequency of a radiative heating element based on infrared thermometer readings of the one or more surfaces.

5. The method of claim 1, wherein pulsing the plurality of radiative heating elements is based on a material composition of the one or more surfaces, an angle or position of the radiative heating elements relative to the one or more surfaces, a shape of the 3D-printed object, and a thickness of a material comprising the one or more surfaces.

6. The method of claim 1, wherein a closed-loop control thermocouple is connected to the plurality of radiative heating elements.

7. The method of claim 1, wherein the radiative heating elements are flexible.

8. A computer system for smoothing a 3D-printed object in a low gravity environment, the computer system comprising:
a plurality of radiative heating elements, one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
positioning the plurality of radiative heating elements within the low-gravity environment to evenly heat one or more surfaces of the 3D-printed object based on a shape of the 3D-printed object, wherein the 3D-printed object is secured in place by a single clamp;
determining, for at least one of the one or more radiative heating elements, a desired heat output necessary to melt the outermost layers of the one or more surfaces; and
pulsing the one or more radiative heating elements to melt the one or more surfaces, wherein the duration and frequency of the pulsing is configured to achieve the desired heat output.

9. The computer system of claim 8, further comprising:
cooling the 3D-printed object through immersion in a coolant.

10. The computer system of claim 8, wherein the plurality of radiative heating elements and the 3D-printed object are disposed within a chamber that is filled with vacuum.

11. The computer system of claim 8, dynamically adjusting the position, pulse duration, or pulse frequency of a radiative heating element based on infrared thermometer readings of the one or more surfaces.

12. The computer system of claim 8, wherein pulsing the plurality of radiative heating elements is based on a material composition of the one or more surfaces, an angle or position of the radiative heating elements relative to the one or more surfaces, a shape of the 3D-printed object, and a thickness of a material comprising the one or more surfaces.

13. The computer system of claim 8, wherein a closed-loop control thermocouple is connected to the plurality of radiative heating elements.

14. The computer system of claim 8, wherein the radiative heating elements are flexible.

15. A computer program product for smoothing a 3D-printed object in a low gravity environment, the computer program product comprising:
one or more computer-readable tangible storage media and program instructions stored on at least one of the one or more tangible storage media, the program instructions executable by a processor to cause the processor to perform a method comprising:
positioning a plurality of radiative heating elements within the low-gravity environment to evenly heat one or more surfaces of the 3D-printed object based on a shape of the 3D-printed object, wherein the 3D-printed object is secured in place by a single clamp;
determining, for at least one of the plurality of radiative heating elements, a desired heat output necessary to melt the outermost layers of the one or more surfaces; and
pulsing the plurality of radiative heating elements to melt the one or more surfaces, wherein the duration and frequency of the pulsing is configured to achieve the desired heat output.

16. The computer program product of claim 15, further comprising:
cooling the 3D-printed object through immersion in a coolant.

17. The computer program product of claim 15, wherein the plurality of radiative heating elements and the 3D-printed object are disposed within a chamber that is filled with vacuum.

18. The computer program product of claim 15, dynamically adjusting the position, pulse duration, or pulse frequency of a radiative heating element based on infrared thermometer readings of the one or more surfaces.

19. The computer program product of claim 15, wherein pulsing the plurality of radiative heating elements is based on a material composition of the one or more surfaces, an angle or position of the radiative heating elements relative to the one or more surfaces, a shape of the 3D-printed object, and a thickness of a material comprising the one or more surfaces.

20. The computer program product of claim 15, wherein a closed-loop control thermocouple is connected to the plurality of radiative heating elements.

* * * * *